United States Patent [19]

Morozumi et al.

[11] Patent Number: 4,998,561
[45] Date of Patent: Mar. 12, 1991

[54] FLOW CONTROL VALVE

[75] Inventors: Eiichi Morozumi; Takashi Tsumura; Hiroyuki Inagaki, all of Kanagawa, Japan

[73] Assignee: Yamatake-Honeywell Co. Ltd., Tokyo, Japan

[21] Appl. No.: 446,376

[22] Filed: Dec. 5, 1989

[30] Foreign Application Priority Data

Dec. 29, 1988 [JP] Japan .................................. 63-332444

[51] Int. Cl.⁵ ................................................ F16K 1/32
[52] U.S. Cl. ........................... 137/630.14; 137/630.15
[58] Field of Search ...................... 137/630.14, 630.15, 137/630.13; 251/38, 45, 282

[56] References Cited

U.S. PATENT DOCUMENTS

| | | | |
|---|---|---|---|
| 2,949,128 | 8/1960 | Carter | 137/630.14 X |
| 3,102,555 | 9/1963 | Botkin | 137/630.15 |
| 3,888,280 | 6/1975 | Tartaglia | 137/630.15 X |
| 3,994,318 | 11/1976 | Ishigaki | 251/45 X |
| 4,342,328 | 8/1982 | Matta | 137/630.15 X |

Primary Examiner—Arnold Rosenthal
Attorney, Agent, or Firm—Whitham & Marhoefer

[57] ABSTRACT

A flow control valve comprising a main valve for opening and closing a fluid conduit, an electromagnetic coil for driving the main valve, a diaphragm responsive to the action of the main valve, a sub-valve chamber partitioned by the main valve and the diaphragm, a sub-valve incorporated in the main valve for opening and closing the sub-valve chamber to a conduit in the secondary side, a projection, protrusively formed on a driving shaft of the electromagnetic coil, responsive to a driving force of the electromagnetic coil for sliding the sub-valve by a predetermined stroke to bring the same in a fully opened state with the main valve remaining in a closed state and thereafter opening the main valve, a bleed orifice provided through a side wall of the main valve for making the pressure in the sub-valve chamber equal to a primary pressure; and a returning spring for urging each of the main valve and the sub-valve in the closing direction.

6 Claims, 4 Drawing Sheets

FLOW CONTROL VALVE

BACKGROUND OF THE INVENTION

1. Field of the Invention

This invention relates to an improvement to a flow control valve for controlling fluid such as gas passing through a conduit, and more particularly to a flow control valve which can smoothly open and close a valve body without being influenced by a primary pressure in the conduit.

2. Description of the Prior Art

FIG. 1 is a cross-sectional view of an example of a conventional electromagnetic valve described in Japanese Utility Model Publication No. 61-13819. In the drawing, a valve housing 1, forming a valve body, has a fluid inlet conduit 2 on the primary pressure side and a fluid outlet conduit 4 on the secondary pressure side connected to the conduit 4 through a valve aperture 3, both conduits separately formed in the valve housing.

A bulkhead through which the valve aperture 3 is formed is provided with a valve seat 3a and integrated, at a central portion thereof, with a valve support 5 which extends at a central portion of the bulkhead toward the inlet conduit 2.

The valve support 5 is provided on the upper surface thereof with a annular body 6 which is surrounded by an o-ring 7 over its outer peripheral surface.

The annular body 6 supports the inner surface of a cylindrical valve body 8 through the 0-ring 7, whereby a primary pressure chamber 9 is defined by the annular body 6 in an upper portion of the inside of the valve body 8. The primary pressure chamber 9 is connected to the inlet conduit 2 through a pressure introducing hole 10 and a strainer 11.

The inner diameter of the valve body 8 is selected to be equal to the effective valve diameter (d).

The valve body 8 is integrally coupled with a plunger 12 and urged by a spring 13 toward a direction in which the valve aperture 3 is closed.

A solenoid (electromagnetic coil) 14 is provided in the vicinity of the plunger 12 for opening and closing the valve body 8.

The operation of the above-mentioned control valve will be next explained. When the electromagnetic coil 14 is not energized, the valve body 8 is urged by the spring 13 to close the valve aperture 3. When the electromagnetic coil 14 is energized, the plunger 12 is lifted against the urging force of the spring 13, whereby the valve body is lifted with the plunger 12 to thereby open the valve aperture 3.

When the valve body 8 is closed, the primary pressure PI prevailing in the inlet conduit 2 acts on the whole outer surface of the valve body 8, while a portion of the primary pressure PI is introduced into the primary pressure chamber 9 through the strainer 11 and the pressure introducing hole 10.

Therefore, the valve body 8 receives a downwardly urging pressure $P_{1d}$ and an upwardly urging pressure $P_{1s}$ acting to open the valve in the primary pressure chamber 9 (S represents a pressure acting dimension in the valve body 8).

Since the inner diameter (D) of the cylindrical valve body 8 is equal to the effective valve diameter (d), the downwardly urging pressure P14 and the upwardly urging pressure $P_{1s}$ are equal so that they are cancelled by each other.

On the other hand, the bottom surface of the valve body 8 is urged by a secondary pressure $P_2S$ on the secondary pressure side. However, since an upwardly urging force produced by the secondary pressure $P_2S$ acts only on the bottom wall of the annular body 6, and not on the valve body 8, it may be ignored as a resistance preventing opening and closing action of the valve body 8.

Thus, even if the primary pressure $P_1$ in the inlet conduit 2 is varied, the valve body is opened and closed, free from the influence caused by variations in the primary pressure $P_1$.

FIG. 2 shows a cross-sectional view of a valve described in Japanese Utility Model Application No. 61-139415, previously filed by the same assignee of the present application.

A housing 15, defined in a valve chamber 1 connected with an output conduit 4, has therein a diaphragm piston 16 integrally coupled with the lower end of a plunger 12. Between the outer peripheral surface of the diaphragm piston 16 and the inner peripheral surface of the housing 15, there is arranged a flexible diaphragm 17 which expands and contracts in accordance with actions of the diaphragm piston 16.

Thus, a primary pressure introducing chamber 9 and a secondary pressure introducing chamber 15a are defined separately in the housing 15 with the flexible diaphragm 17 and the diaphragm 16.

The primary pressure introducing chamber 9 is connected to an inlet conduit 2 through a pressure introducing pipe 10, while the secondary pressure introducing chamber 15a is connected to the outlet conduit 4 through an through-hole 15b formed through a central portion of the bottom wall of the housing 15. The diaphragm piston 16 is integrally connected to the valve body 8 through a valve shaft 18 which penetrates the through-hole 15b.

The valve body 8, constructed as described above, is accommodated in the inlet conduit 2 in a manner such that it is upwardly urged by a spring 13. When the electromagnetic coil 14 is not energized, the valve body 8 is upwardly urged by the urging force of the spring 13 to close the valve opening 3. In this condition, the primary pressure $P_1$ prevailing in the inlet conduit 2 is introduced though the pressure introducing pipe lo into the primary pressure introducing chamber 9, while the secondary pressure $P_2$ in the outlet conduit 4 is introduced through the through-hole 15b into the secondary pressure introducing chamber 15a. At the same time, the primary pressure $P_1$ acts on one surface of the valve body 8, and the secondary pressure $P_2$ on the other surface of the same.

The primary and secondary pressures $P_1$ and $P_2$ are equal to those $P_{1c}$ and $P_{sc}$ in the primary and secondary pressure introducing chambers 9 and 5b, so that they are cancelled by each other.

Thus, even if pressures in the inlet and outlet conduits are varied, the valve body 8a will never be influenced by such variation, thereby ensuring smooth and precise opening and closing actions even with a small driving force.

However, in the electromagnetic valve shown in FIG. 1, the sliding portion includes the 0-ring 7 which may increase a sliding resistance and a starting resistance of the valve body 8, so that the driving force for the valve body 8 cannot be reduced.

Further, as the electromagnetic valve is used for a long period, the 0-ring 7 is first deteriorated due to abrasion, whereby a gas leak and further dangerous situations caused thereby will occur when the electromagnetic valve is employed to control a gas flow.

Also, since the electromagnetic valve of FIG. 1 is constructed such that the valve support 5 is projected from a central portion of the valve aperture toward the center of the valve body 8 and the annular body 6 is integrally formed on the upper end of the valve support 5, the valve support 5 has a quite low strength.

Moreover, the center of the valve support 5 must be precisely aligned with the center of the plunger 12. Such alignment requires a high machining accuracy, thereby rendering the production thereof difficult and the production cost increased.

The above-mentioned problems can be solved by the valve constructed as shown in FIG. 2. However, this type of valve also has a problem that, if the diaphragm is broken, a pressurized fluid in the primary side such as gas leaks to the secondary side, thereby damaging the security of the whole process.

OBJECTS AND SUMMARY OF THE INVENTION

In view of the above-mentioned problems, it is an object of the present invention to provide a flow control valve which improves the deficient construction of conventional control valves in which a seal ring or an 0-ring may be abraded due to a sliding resistance of the valve body, a starting resistance and so on, by removing abraded portions such as the 0-ring.

In addition, the flow control valve according to the present invention can smoothly open and close its main valve with a small driving force and also prevent leak of fluid such as gas to the secondary side, even if the diaphragm is broken, to thereby maintain the security of the whole process.

To achieve the above objects, the present invention provides a flow control valve comprising:

a main valve means for opening and closing a fluid conduit;

a driving means for driving the main valve means;

a diaphragm responsive to the action of the main valve means:

a sub-valve chamber partitioned by the main valve means and the diaphragm;

a sub-valve means incorporated in the main valve means for opening and closing the sub-valve chamber to a conduit in the secondary side;

a projection, protrusively formed on a driving shaft of the driving means, responsive to a driving force of the driving means for sliding the sub-valve means by a predetermined stroke to bring the same in a fully opened state with the main valve means remaining in a closed state and thereafter opening the main valve means;

a bleed orifice means provided through a side wall of the main valve means for making the pressure in the sub-valve chamber equal to a primary pressure; and a returning spring means for urging each of the main valve means and said sub-valve means in the closing direction.

The above and other objects and features of the present invention will become apparent from the following detailed description of the preferred embodiments with reference to the accompanying drawings.

DETAILED DESCRIPTION OF THE PREFERRED EMBODIMENT

Figure 1:
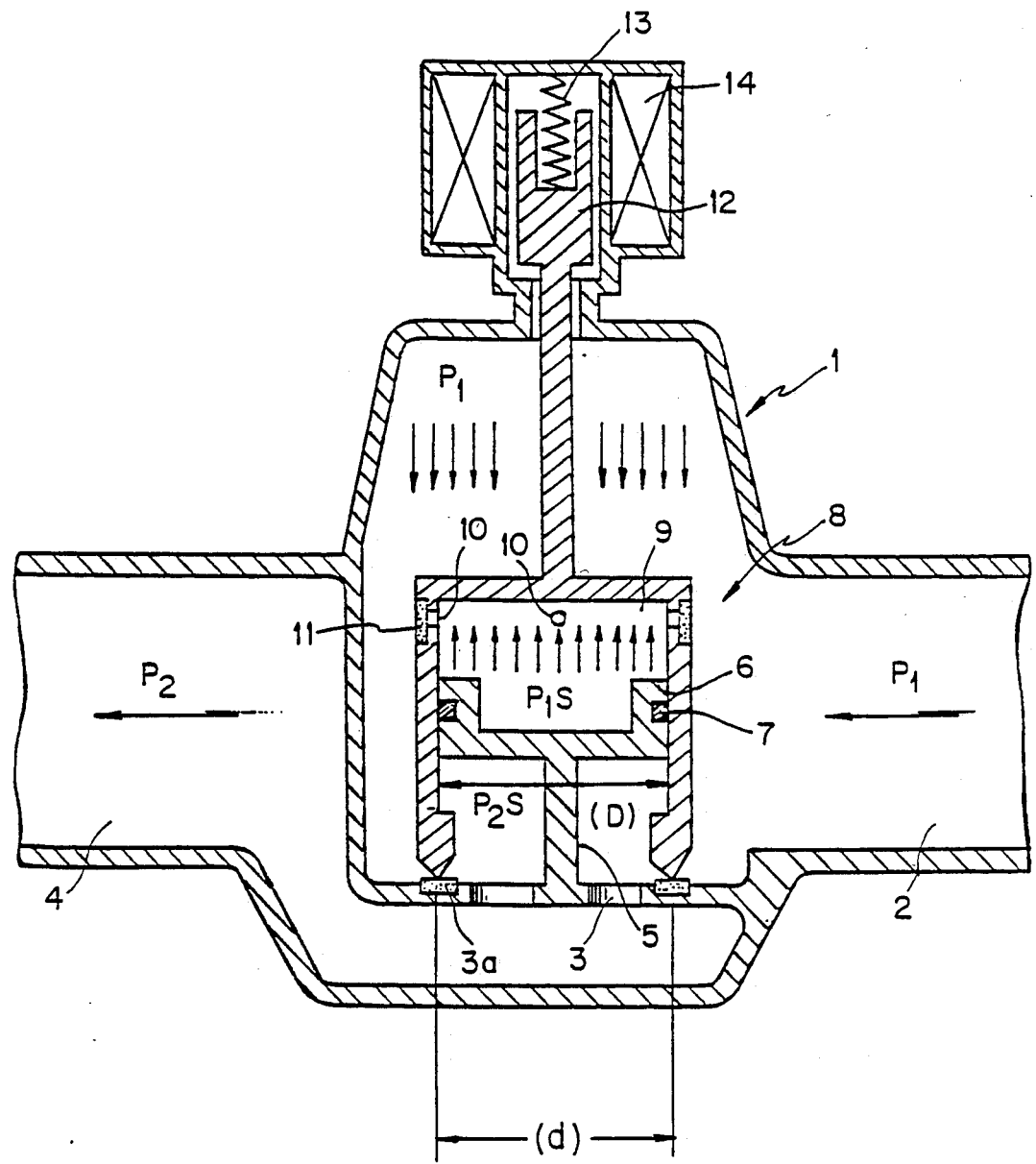
FIG. 1 is a cross-sectional view showing a construction of a conventional electromagnetic control valve.
Figure 2:
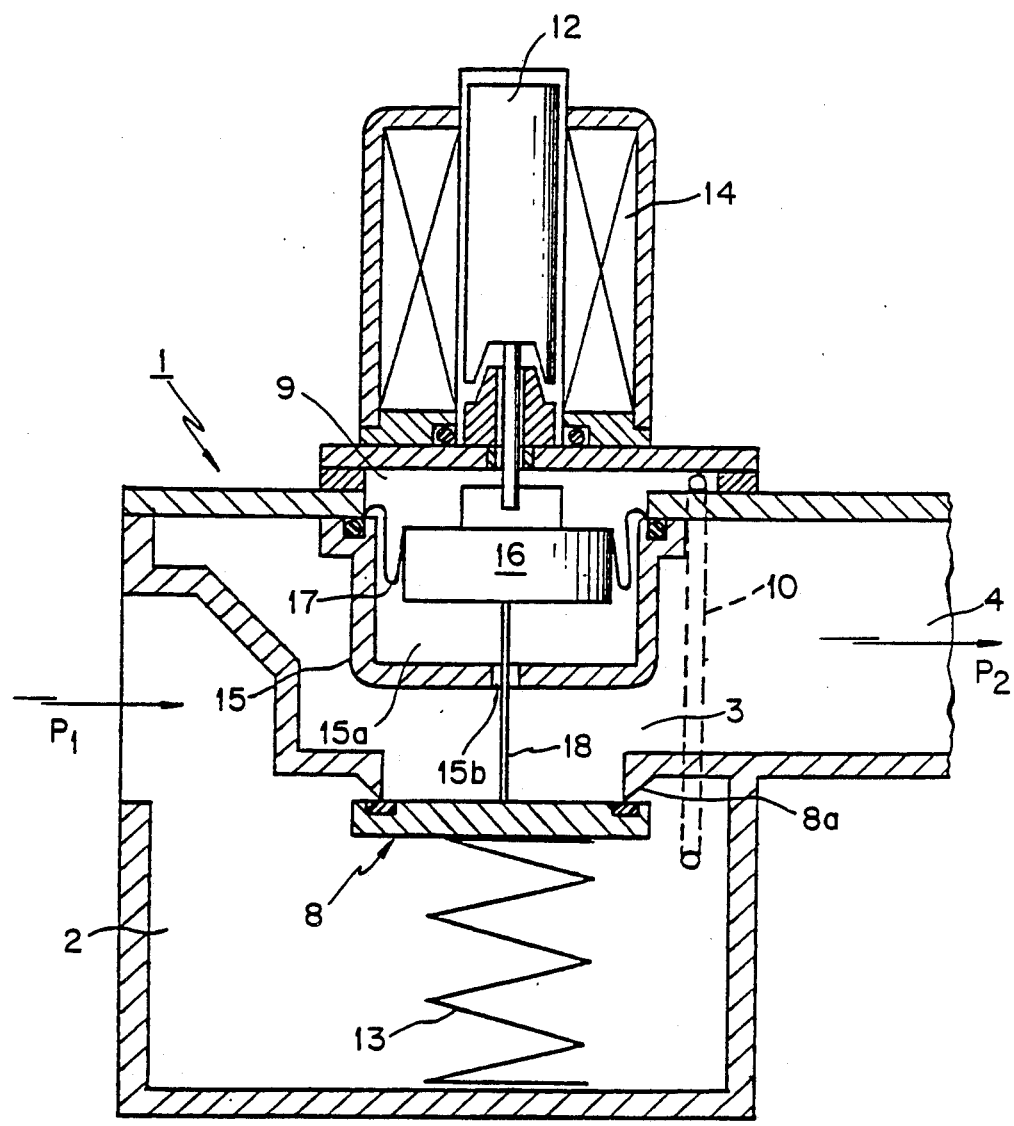
FIG. 2 is a cross-sectional view showing a construction of another conventional electromagnetic control valve.
Figure 3:
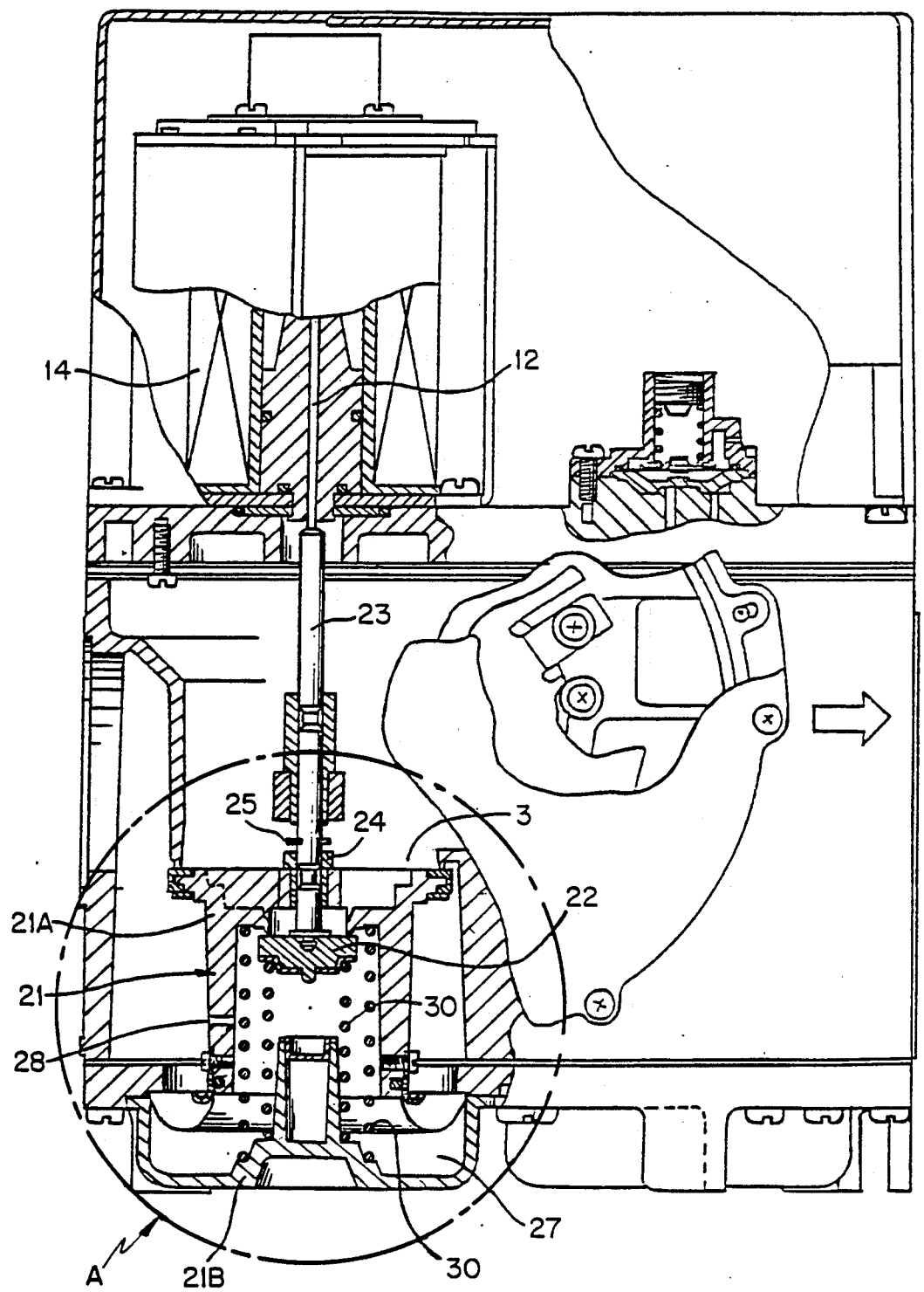
FIG. 3 is a cross-sectional view of an embodiment of a flow control valve according to the present invention.
Figure 4:
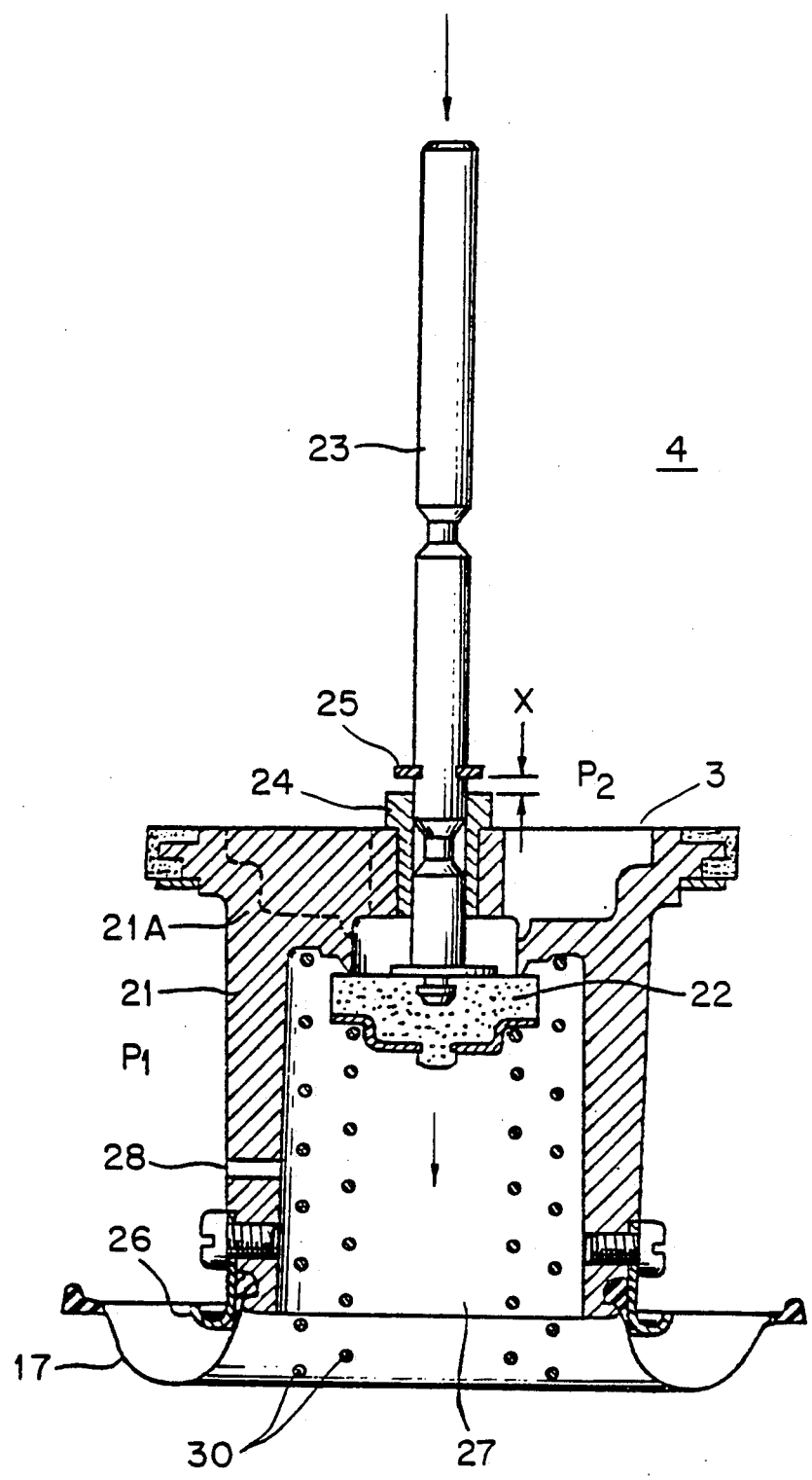
FIG. 4 is an enlarged cross-sectional view of a main portion (encircled portion) of the flow control valve shown in FIG. 3.

An embodiment of a flow control valve according to the present invention will hereinafter be explained with reference to FIGS. 3 and 4 in which parts corresponding to those in the examples shown in FIGS. 1 and 2 are designated the same reference numerals and the explanation thereof will be omitted.

A valve housing 1 includes a main valve 21 for opening and closing a valve aperture 3 and a sub-valve 22 incorporated in a central portion of the main valve 21. The sub-valve 22 is coupled with a shaft 23 at its central portion through a bearing 24 of the main valve 21. The shaft 23 has the upper end coupled with a plunger 12 driven by an electromagnetic coil 14 which serves as a driving means. The plunger 12 is arranged slidable over a predetermined stroke X by the action of a projection protrusively provided on the shaft 23.

A diaphragm 17, spread between a side wall 21A and a bottom plate 21B and fixed by fixing ring 26, has a surface area substantially equal to the effective dimension on which the main valve 21 receives a primary pressure Pl and is arranged to expand and contract following the action of the main valve 21. A sub-valve chamber 27 is partitioned by the diaphragm 1 and the side wall 21A on the primary pressure side of the main valve 21.

The side wall 21A of the main valve 21 is provided with a bleed orifice 28 which makes the pressure prevailing in the sub-valve chamber 2 equal to the primary pressure Pl, whereby a large driving force is not required to the electromagnetic coil 14 and accordingly the main valve 21 can be opened and closed only with a small driving force.

The main valve 21 and sub-valve 22 are also provided with a returning spring 30 for urging the main valve 21 and the sub-valve 22 in the closing direction.

Next, the action of the above described valve will be explained. When the electromagnetic valve 14 is not energized, the main valve 21 and the sub-valve 22 are both lifted by an urging force of the returning spring 30 to be in a closed state. In this condition, the pressure in the sub-valve chamber 27 is equal to the primary pressure P1 since the primary pressure P1 enters into the sub-valve chamber 27 through the bleed orifice 28.

When the electromagnetic valve 14 is then energized, the plunger 12 and accordingly the driving shaft 23 coupled to the plunger 12 go down. Following this action, the sub-valve 22 goes down by the predetermined stroke X limited by the projection 25 protrusively formed on the shaft 23, with the main valve remaining in the closed state, whereby the subvalve 22 is opened prior to the main valve 21. Next, the driving shaft further goes down, the main valve 21 starts going down with the subvalve 22. Consequently, the primary pressure side of the main valve 21, the sub-valve chamber 2 and a secondary side conduit 4 are communicated with each other, whereby the primary pressure P1 enters into the secondary side conduit 4.

It will be appreciated that the flow control valve of the present invention as described above does not include a rubbed or abraded portion in the main valve 21, such as the 0-ring 7 shown in FIG. 1, so that it is free from a sliding resistance and a starting resistance of the valve body.

Also, since pressure variations in the conduit are absorbed by the diaphragm 17, the main valve 21 can be smoothly opened without being influenced by variations in pressure and only with a small driving force which is sufficient to contract the returning spring 30, with the result that the electromagnetic solenoid can be reduced in size.

Further, even if the diaphragm 17 is broken, the bleed orifice 28 makes the pressure in the sub-valve chamber 27 equal to the primary pressure and the sub-valve 22 is automatically closed by the urging force of the returning spring 30, to thereby prevent a fluid such as gas from leaking into the secondary side and accordingly ensure a fail-safe function.

Since many changes could be made in the above construction and many apparently widely differing embodiments of the present invention could be made without departing from the scope thereof, it is intended that all matter contained in the above description or shown in the accompanying drawings shall be interpreted as illustrative and not in a limiting sense.

What is claimed is:

1. A flow control valve comprising:
   a main valve means for opening and closing a fluid conduit, said fluid conduit having a primary side and a secondary side;
   a driving means for driving said main valve means;
   a diaphragm coupled to said main valve means;
   a sub-valve chamber defined by said main valve means and said diaphragm;
   a sub-valve mans incorporated in said main valve means for opening and closing said sub-valve chamber to a conduit in said secondary side;
   a projection, protrusively formed on a driving shaft of said driving means, responsive to a driving force of said driving means for sliding said sub-valve means by a predetermined stroke to bring the same in a fully opened state with said main valve means remaining in a closed state and thereafter opening said main valve means;
   a bleed orifice means provided through a side wall of said main valve mans for allowing the pressure in said sub-valve chamber to rise to a pressure equal to that of said primary side of said conduit when said sub-valve means is closed; and
   a returning spring means for urging each of said main valve means and said sub-valve means in the closing direction.

2. A flow control valve comprising
   a fluid conduit having a primary side and a secondary side separated by a main valve means, said main valve means having a first area and including a sub-valve means;
   a diaphragm attached to a portion of said main valve means and having a perimeter which defines a second area approximately equal to said first area;
   a chamber separated from said fluid conduit by said diaphragm and having a bleed orifice for allowing pressure in said chamber to rise to a pressure which equals a pressure in said primary side of said fluid conduit when both said valve means and said sub-valve means are closed, said pressure tending to retain at least said main valve means in a closed position;
   driving means for opening said sub-valve means prior to opening said main valve means;
   said pressure in said chamber being released to said secondary side in response to said opening of said sub-valve means and pressure in said primary side against said first area of said main valve means is balanced by said pressure in said primary side against said diaphragm.

3. A flow control valve according to claim 2, wherein said portion of said main valve means to which said diaphragm is attached surrounds a periphery of said sub-valve means.

4. A flow control valve according to claim 2, wherein said driving means opens said sub-valve means prior to opening said main valve means during respective portions of a predetermined stroke.

5. A flow control valve according to claim 2, wherein a portion of said chamber is formed within said main valve means.

6. A flow control valve as recited in claim 2, wherein said driving means includes a projection, protrusively formed on a driving shaft of said driving means, responsive to a driving force of said driving means for sliding said sub-valve means by a predetermined stroke to bring the same in a fully opened with said main valve means remaining in a closed state and thereafter opening said main valve means.

* * * * *